UNITED STATES PATENT OFFICE.

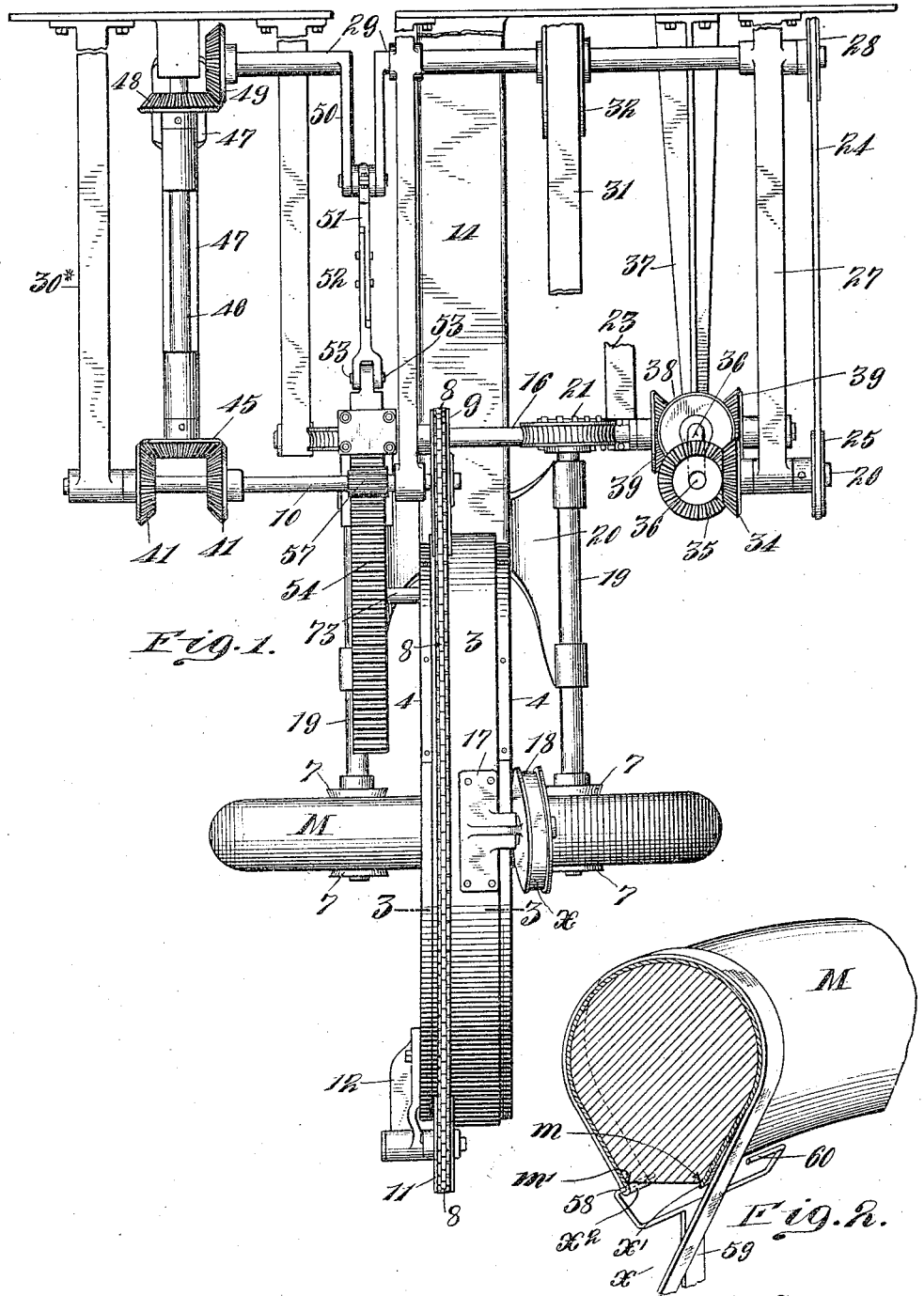

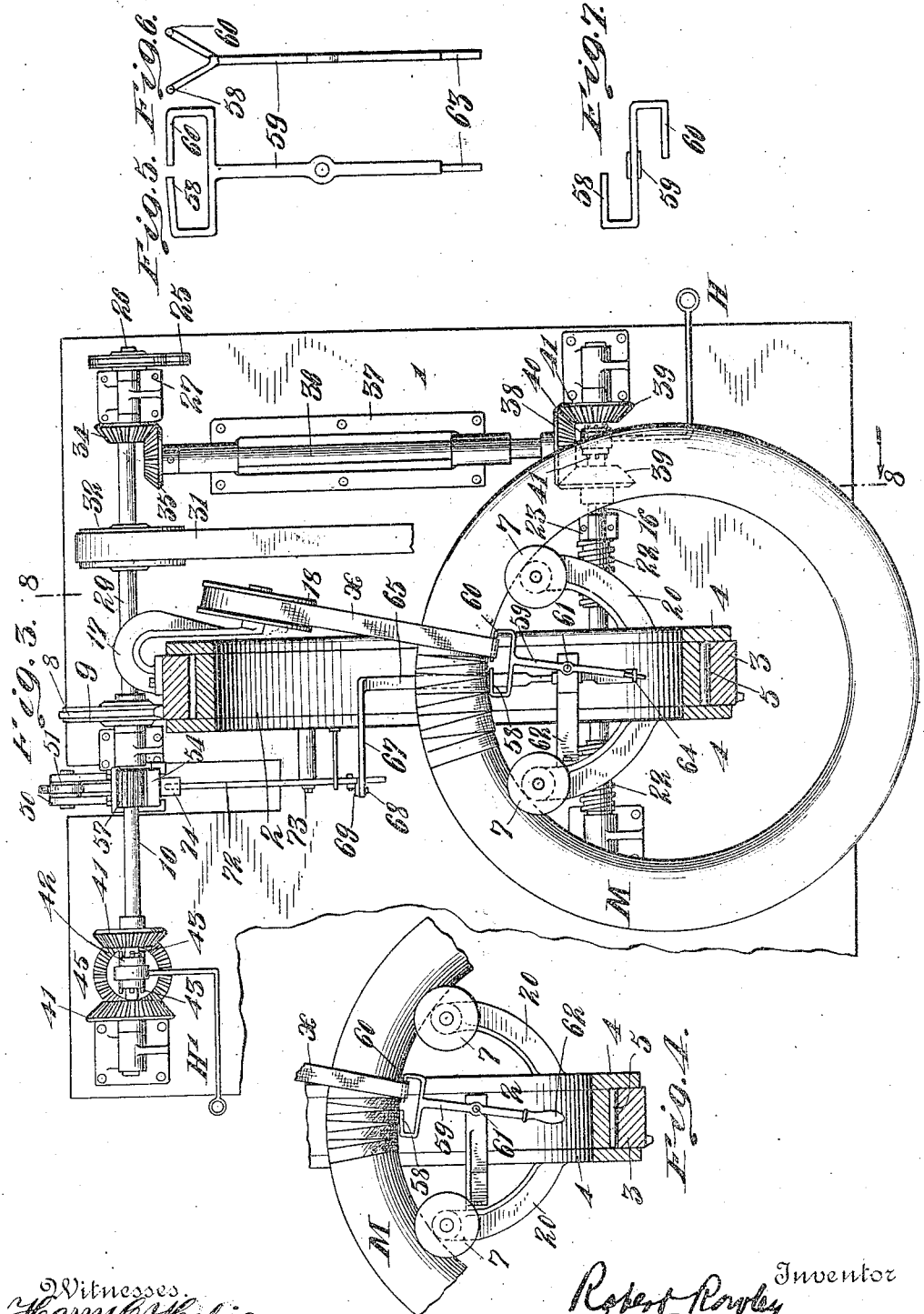

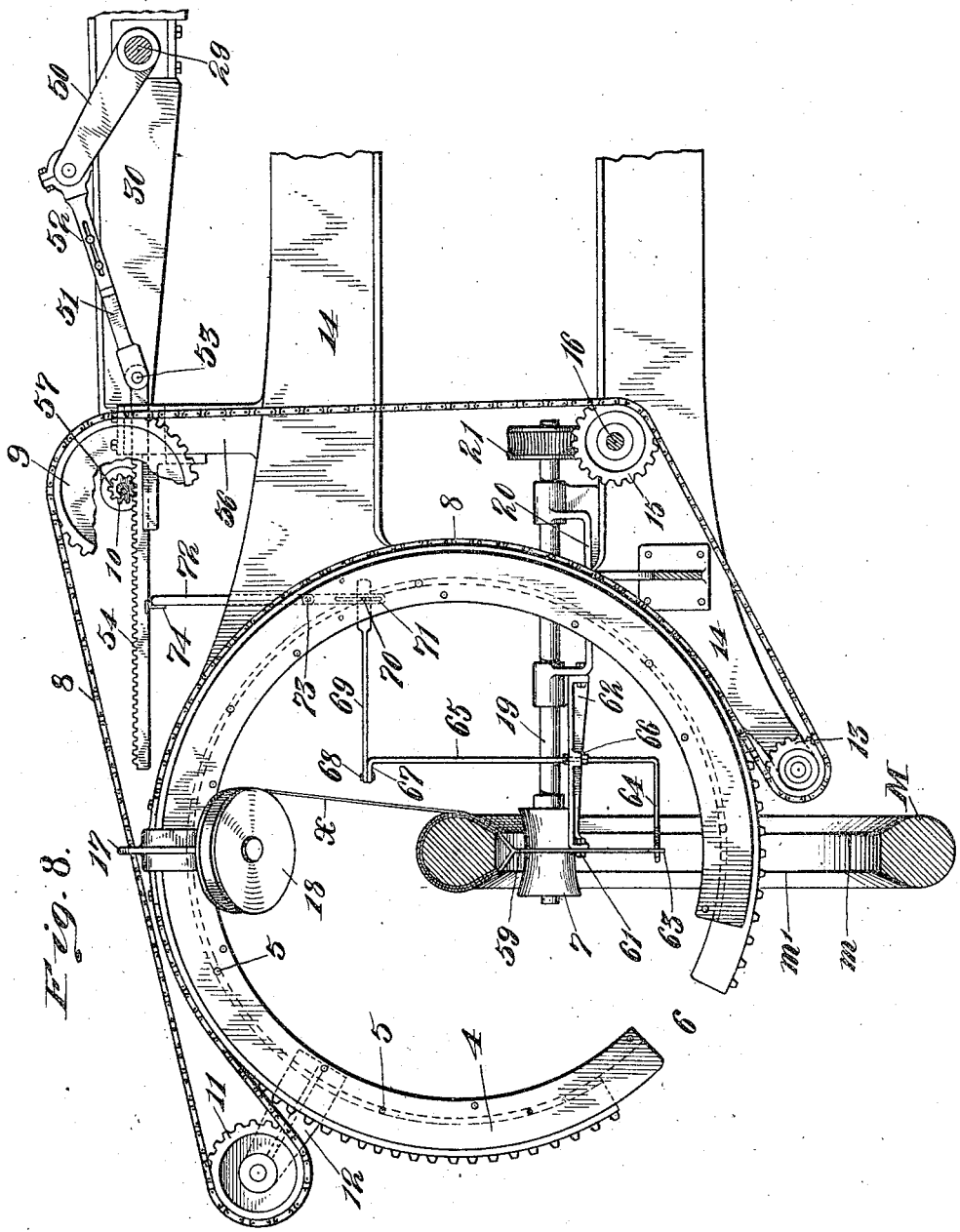

ROBERT ROWLEY, OF NEW YORK, N. Y.

TIRE-BUILDING MACHINE.

990,392. Specification of Letters Patent. Patented Apr. 25, 1911.

Application filed June 25, 1910. Serial No. 568,857.

*To all whom it may concern:*

Be it known that I, ROBERT ROWLEY, citizen of the United States, residing at New York city, in the county of New York and State of New York, have invented certain new and useful Improvements in Tire-Building Machines, of which the following is a specification, reference being had therein to the accompanying drawings.

This invention relates to machines for use in the production of open-bellied tire shoes, and its main objects are two in number:—

First, to produce a machine for laying a strip of friction fabric, back and forth in part upon the opposite side and intermediate tread portion of an annular mandrel, and in part upon itself, from edge to edge of the open-bellied shoe being formed, and also circumferentially around the mandrel to complete an open-bellied annular shoe; that is, a shoe which is formed, during the operation of the machine, in endless, concavo-convex form, with an opening around its inner periphery. The product of the present form of machine and the method which it is adapted to carry out mechanically are set forth in my application Serial No. 566,039, filed June 9, 1910.

Second, to contrive said machine in such wise that by throwing certain mechanisms, used in laying the tire-forming material back and forth as described, out of operation, the same machine may be used for either of two classes of operations in the manufacture of tires, to wit: (*a*) the construction of tires by reverse-spiral winding of tire-forming material both transversely and circumferentially around the mandrel to form initially an endless tube which is subsequently slit around its inner periphery, as more fully set forth in the pending applications of James J. Coomber and myself, Serial No. 551,440, filed March 25, 1910, and Serial No. 556,792, filed April 21, 1910; and (*b*) for wrapping tire shoes (by whatever method built up) preparatory to open-cure vulcanization, as set forth, for example, in the allowed applications of said Coomber and myself, Serial No. 511,188, filed August 4, 1909, and Serial No. 511,189, filed August 4, 1909.

As a matter of convenience, I shall hereinafter first describe the present machine with reference to the second object of my invention, as in that respect it is like the machine of said application Serial No. 556,792.

In the accompanying drawings, illustrating the principle of my invention and the best mode now known to me of applying that principle, Figure 1 is a top-plan view of my new machine. Fig. 2 is a view partly in transverse section and partly in perspective of a portion of an annular mandrel, and partially showing a device (herein called the strip-holder) for alternately holding a tire-forming strip or tape (of friction fabric) at opposite edges of the shoe in process, when the strip is bent back and forth transversely of the mandrel, and as the strip is carried circumferentially around the mandrel to form a complete shoe. Fig. 3 is in the main a vertical front elevation of the machine, but partially in cross-section, at line 3—3 of Fig. 1. Fig. 4 is a view partially in section, at a line corresponding to line 3—3 of Fig. 1, through the spool-carrier and its support, but in the main is a front elevation of the strip-holder in manually operable form instead of in the mechanically actuated form shown in other figures of the drawings. Figs. 5, 6 and 7 are, respectively, side, edge and plan views of the strip-holder detached. Fig. 8 is a view partly in section, at line 8—8 of Fig. 1, but mainly in side elevation, of my new machine, portions being broken away for greater clearness.

Referring to the drawings, 1 is a main-frame provided with a projecting, stationary, circularly arcuate spool-carrier support 2, on the outer periphery of which the circularly arcuate spool-carrier 3 is rotatably mounted, being held thereon laterally by the side rings 4 of the support, these rings projecting beyond the outer peripheral wall of the support to form a guideway in which the spool-carrier is located. Anti-friction rolls 5 are desirably placed between opposed peripheral walls of the support and carrier; and the support and carrier are formed with front openings 6 through their sides of a width sufficient to permit the lateral passage therethrough of an annular shoe-forming mandrel M, which is rotatively supported by a pair of horizontal, peripherally dished rolls 7, the mandrel hanging thereon.

The spool-carrier is preferably in the form of a circularly arcuate sprocket-wheel, and is rotated by an endless sprocket-chain 8 that runs over a sprocket drive-wheel 9 on a spool drive-shaft 10 of the machine and also over idler sprocket 11 journaled in a rigid bracket 12 fast to the stationary support 2, and over an idler sprocket 13 journaled in the lower of the two brackets 14 of frame 1, and over a third idler sprocket 15 on shaft 16. Brackets 14, 14 carry the spool-carrier support 2. These sprocket-wheels are rearward of the front openings 6, and hence the sprocket-chain 8 does not cross the openings, and therefore does not interfere with the insertion or removal of the mandrel M which encircles the lower arc of support 2 and carrier 3, the relative planes of the mandrel and spool-carrier, one in relation to the other, being at substantially right angles one to the other. Drive-shaft 10 is journaled in brackets 30 and 30* of the frame.

The spool-carrier or sprocket 3 has a spool-carrying bracket 17 fixed to it and projecting laterally of it, so that the spool 18, journaled in the bracket, overhangs the mandrel, and tape $x$ on the spool may pass to the mandrel in operation.

The mandrel is rotatively supported, as stated, on a pair of parallel rolls 7 having dished peripheries. These are located one on one side and the other on the other side of the spool-carrier and its support, parallel with the sides thereof. The mandrel hangs on these supports, and its weight suffices to insure its rotation by frictional engagement with rolls 7 when the latter are rotated. Each roll is fixed on a horizontal shaft 19 journaled in a bracket fast to the main-frame. On the rearward end of each shaft 19, a worm gear 21 is fixed, each meshing with a worm 22 on the shaft 16, which extends transversely of the machine and is journaled in brackets 23, 23 of the main-frame.

The pitch of the teeth of the worm gears and worms is such that the two rolls 7, 7 are rotated in the same direction to rotate the mandrel. The shaft 16 is rotated as follows: An endless sprocket-chain 24 extends from a sprocket 25 fixed on stud 26 journaled in bracket 27 of the main-frame, to a sprocket 28 fixed on transverse driving-shaft 29 journaled in brackets 27 and 30 of the frame; and shaft 29 is driven in any suitable manner, as by a belt 31, from its fixed pulley 32 to a source of power.

Stud 26 carries a fixed bevel-gear 34 which meshes with a bevel-gear 35 on the upper end of a slanted, upright shaft 36 journaled in bracket 37 of the frame (Fig. 3). The lower end of shaft 36 carries a fixed bevel-gear 38 that is in constant mesh with two bevel-gears 39, 39, each loose on shaft 16 and having between them a shiftable clutch member 40 slidable on shaft 16 and having interlocking pins 41 on each side, adapted to engage one or another set of recesses in gears 39, as will be readily understood without particular illustration, so as to rotate shaft 16, and consequently the mandrel, in either direction at the will of the operator. Clutch 40 has a handle H, and may be called the mandrel drive and shift mechanism.

To rotate shaft 10, and consequently the spool-carrier, in either direction, at will, shaft 10 is provided with a pair of loose bevel-gears 41, 41, between which, on shaft 10, a clutch member 42 is slidably mounted and provided with pins 43 to engage one or another set of recesses in gears 41, which are in constant mesh with a bevel-gear on a shaft 46 journaled in a bracket 47 of the frame and having at its rearward end a fixed bevel-gear 48 that meshes with bevel-gear 49 fast on the shaft. Clutch 42 is provided with a handle H'.

As the bevel gears 41, 41 are each loose on shaft 10, it is obvious that if clutch 42 is in inoperative position, as shown in Fig. 3 (it is omitted in Fig. 1 for greater clearness), the shaft 46 will run idly, so that the sprocket-chain drive shaft 10 will not be thereby rotated, as is the case when the machine is to be used for reverse-spirally winding, either in the building up of a carcass initially in the form of an endless tube, or for spirally wrapping preparatory to open-cure vulcanization. For these purposes, clutch 42 may be considered as the spool drive and shift mechanism.

Coming, now, to the first stated object of my present invention,—the back and forth laying of the strip $x$, part way around the mandrel transversely, and wholly around it circumferentially,—and assuming that clutch 42 is in neutral position, I note that shaft 29 is formed with a crank-arm 50 carrying one end of a jointed pitman 51 that is readily detachable from the crank arm by taking out the bolts 52 in the pitman joint (Figs. 1 and 8). The other end of the pitman is pivotally connected at 53 with a horizontal, endwise slidable rack 54 which is mounted in a way 55 formed in the upward extension 56 of the upper bracket 14 (Fig. 8). This rack meshes with a pinion 57 fixed on shaft 10, and therefore serves to rock shaft 10 when clutch 42 is in the neutral position in which it is kept when this rocking movement is given to shaft 10 to rock the spool-carrier for the transverse laying of the strip $x$.

Of course, whenever the machine is to be used in a spiral winding operation, the spool-carrier being then rotated instead of rocked, the pitman and rack are removed from the machine, in which case the spool-carrier is rotated in either direction according to the working position given clutch 42.

In laying strip $x$ as partially indicated in Fig. 2, and for carrying out the first main object of this invention, its free end $x'$ is applied to the mandrel corner portion (Fig. 2) $m$. A rocking movement of the spool-carrier causes the spool to move from one side to the other side of the mandrel, and as strip $x$ is reeled on the spool a portion of it between the free end $x'$ and the spool is laid up one side, across the tread and down the other side of the mandrel. As strip $x$ is of friction fabric, it is adhesive, and sticks on itself where it is reeled. Hence the strip is pulled off the spool under its own adhesive tension. Similarly, the strip, where it initially contacts with the mandrel, adheres to it with considerable tenacity; and the strip is smoothly laid in place, not only initially but in its subsequent disposition, partially upon the mandrel and partially upon itself, due to its spiral-wise application to the mandrel as the latter is slowly rotated.

For the reason that the cross-sectional areas of the mandrels used in building up different sizes of tires vary, the pitman is not only jointed for removal, as above stated, but its jointed portion is made adjustable, so that rack 54 may be reciprocated to predetermined positions at each end of its stroke in order to rock the spool-carrier the required distance to lay a portion of strip $x$ transversely of the mandrel from its corner portion $m$ to its opposite corner portion $m'$, these so-called corner portions being at the inner periphery of the mandrel, at or near the edges of the shoe carcass in process. When strip $x$ has been first bent across the mandrel, it is then bent back partly upon itself and partly upon the mandrel, and in the bight $x^2$ thus first formed a finger 58 of the holder 59 is inserted, thus holding the bent strip down and in place upon one side of the mandrel while the strip is returned upwardly, across and downwardly of the mandrel, to be again bent back upon itself and laid partially on the mandrel and partially upon itself. In the second bight formed in the loop, the finger 60 of the strip-holder is inserted. These operations are continued until, by the successive oscillations or reverse rocking movements of the spool-carrier combined with the rotation of the mandrel, the latter is covered circumferentially and from corner portion $m$ to corner portion $m'$ with the initial or foundation layer of the open-bellied shoe carcass. The oscillations of the spool-carrier are determined by the predetermined length of stroke of rack 54 and the rotational movement of the mandrel by shifting clutch 40.

In practice, the bends of strip $x$ are made within the inner periphery of the annular mandrel, as indicated in Fig. 2, so that, after annular clencher beads are in place around and between marginal portions of superimposed open-bellied shells, such as may be successively formed by the just described operation of the machine, the edges of the carcass may be worked into final shape for vulcanization by trimming or otherwise.

When the first shell or foundation layer has been carried circumferentially around the mandrel, the latter may be reversed in its rotational movement by shifting clutch 40, and a second shell reversely laid spiral-wise upon the first formed shell. Of course, as many shells may be superimposed as desired. When a carcass has been partially built up to desired thickness, clencher bead rings may be located around the edges of the simple or composite shell, and one or more other shells superimposed over the assembled primary or foundation shell and bead rings, all as explained in said application Serial No. 556,792.

The shank of the strip-holder is pivoted at 61 to bracket 62 extending from bracket 20 (Fig. 3), and its fingers 58 and 60 are spread apart in a sort of V shape, so that one finger works adjacently to mandrel corner $m$ and the other finger works adjacently to the opposite mandrel corner $m'$. The bight-engaging portions of the fingers point in opposite directions, and when one finger enters a bight on one side of the mandrel, the other moves out of the path of the strip when it is brought down the opposite side of the mandrel. The shank of the strip-holder may be actuated by hand to reciprocate the fingers into and out of the bight successively and oppositely formed, as shown in Fig. 2, where the shank is provided with a handle 62 at its lower end; but, by present preference, the strip-holder has its lower end in engagement with the horizontal arm 64 of a bell-crank lever the vertical body portion 65 of which is rockably mounted at 66 in bracket 62, the upper arm 67 of the bell-crank being horizontal link 69, the other end of which is provided with a pin 70 that works in the lengthwise extending slot 71 of the vertical lever 72 which is pivoted to the frame at 73, its upper end being engaged first on one side and then on the opposite side by the depending lug 74 on the under side of rack 54. When this rack moves in one direction, lug 74 pushes the upper free end of lever 72 in the same direction, and then passes over the end of the lever. On the reverse movement of the rack, lever 72 is pushed in the opposite direction, with the result that the strip-holder fingers are reciprocated by the reciprocating movements of the rack that oscillates or rocks the spool-carrier. The described parts are, of course, properly timed in actual construction to work synchonously; and the various described mechanical parts may be varied without departure from my invention.

What I claim is:—

1. The combination of an arcuate spool-carrier support with an arcuate spool-carrier provided with a spool; means for rotatably supporting an annular mandrel in encircling position around an arc of the carrier support and carrier; and means for automatically rocking the carrier in, and limiting its rocking movement to, a portion of a circle.

2. The combination of an arcuate spool-carrier support with an arcuate spool-carrier provided with a spool; means for rotatably supporting an annular mandrel in encircling position around an arc of the carrier-support and carrier; means for automatically rocking the carrier in, and limiting its rocking movement to, a portion of a circle; and a movable strip-holder having bight engaging members at each side of the mandrel.

3. The combination of an arcuate spool-carrier support with an arcuate spool-carrier provided with a spool; means for rotatably supporting an annular mandrel in encircling position around an arc of the carrier support and carrier; an annular mandrel; means for automatically rocking the carrier on its support to carry the spool back and forth from side to side of and across the outer periphery of the mandrel; means for rotating the mandrel; and means at each side of the mandrel for holding the edge portions of a concavo-convex strip when so formed and bent on the mandrel in the operation of the machine.

4. The combination with an annular mandrel and means for rotating it of therewith coöperating mechanism for laying a strip back and forth on the outer peripheral and adjacent side portions of the mandrel and, progressively, circumferentially around the mandrel from one inner peripheral, to the opposite inner peripheral, corner portion of the mandrel; and means operable at each side of the mandrel for alternately engaging and disengaging the bent end portion of the strip as it is successively bent back and forth transversely of and laid circumferentially around the mandrel on the outer peripheral and side portions thereof.

5. The combination of an arcuate spool-carrier support with an arcuate spool-carrier provided with a spool and slidably mounted on the support; mechanism rotating the carrier and mechanism for rocking the carrier, each such mechanism being capable of disablement at the will of the operator.

6. The combination of a drive-shaft; an arcuate spool-carrier support; an arcuate spool-carrier provided with a spool; and mechanism for rocking the spool-carrier on its support, said mechanism comprising a lengthwise adjustable pitman connected with the drive-shaft.

7. The combination of a drive-shaft; an arcuate spool-carrier support; an arcuate spool-carrier provided with a spool; and mechanism for rocking the spool-carrier on its support, said mechanism comprising a lengthwise adjustable, removable pitman connected with the drive-shaft.

In testimony whereof I have affixed my signature in presence of two witnesses.

ROBERT ROWLEY.

Witnesses:
EDWARD E. BLACK,
EDWARD S. BEARD.